United States Patent
Thornton et al.

(10) Patent No.: US 11,930,957 B1
(45) Date of Patent: Mar. 19, 2024

(54) PIE CRUST PROTECTOR FOR PROTECTING THE OUTER EDGE OF A PIE CRUST DURING BAKING

(71) Applicants: Mark Thornton, Austin, TX (US); Jo Thornton, Austin, TX (US)

(72) Inventors: Mark Thornton, Austin, TX (US); Jo Thornton, Austin, TX (US)

( * ) Notice: Subject to any disclaimer, the term of this patent is extended or adjusted under 35 U.S.C. 154(b) by 0 days.

(21) Appl. No.: 18/373,881

(22) Filed: Sep. 27, 2023

Related U.S. Application Data

(60) Provisional application No. 63/410,341, filed on Sep. 27, 2022.

(51) Int. Cl.
| | |
|---|---|
| *A21B 3/13* | (2006.01) |
| *A47J 37/00* | (2006.01) |
| *A47J 37/01* | (2006.01) |

(52) U.S. Cl.
CPC .............. *A47J 37/00* (2013.01); *A21B 3/135* (2013.01); *A47J 37/01* (2013.01); *A21B 3/13* (2013.01)

(58) Field of Classification Search
CPC .. A21B 3/135; A21B 3/13; A47J 37/01; A47J 36/00
USPC .................................................. 99/433, 645
See application file for complete search history.

(56) References Cited

U.S. PATENT DOCUMENTS

| | | | | |
|---|---|---|---|---|
| 2,077,868 A | * | 4/1937 | Adams ..................... | A47J 43/20 220/4.03 |
| 2,784,664 A | * | 3/1957 | Tippel ..................... | A47J 43/20 99/DIG. 15 |
| 5,456,162 A | * | 10/1995 | Polizzotto .............. | A21B 3/135 220/4.03 |
| 2009/0255420 A1 | * | 10/2009 | Freeman ................ | A21B 3/135 99/645 |

* cited by examiner

*Primary Examiner* — Reginald Alexander
(74) *Attorney, Agent, or Firm* — HULSEY P.C.

(57) ABSTRACT

Pie crust protector or pie shield for protecting the outer edge of a pie crust during baking is disclosed. The pie crust protector includes an annular section with a first flange segment and a second flange segment, each of which encompasses first grooves and first cut sections. The first grooves and the first cut sections allow each of the first flange segment and the second flange segment to easily flex and receive a pie and/or a pie pan. The pie crust protector includes a C-cross member segmented on the top and bottom sides. The annular section encloses the outer edge of the pie on three sides and the C-cross member encloses the remaining portion of the pie. The pie crust protector protects the outer edge of the pie during long bake times in standard or convection ovens, regardless of the location of a heating element.

20 Claims, 6 Drawing Sheets

PIE CRUST PROTECTOR FOR PROTECTING THE OUTER EDGE OF A PIE CRUST DURING BAKING

The present invention claims the benefit of U.S. Provisional Application No. 63/410,341, filed Sep. 27, 2022, all of which is incorporated herein by reference in its entirety.

FIELD OF THE INVENTION

The present invention generally relates to bakeware. More particularly, the present invention relates to a pie crust protector that acts as a shield for protecting the outer edge of a pie crust during baking.

DESCRIPTION OF THE RELATED ART

Many people devote considerable time to improving the quality of cuisine or cooking. For instance, some people like to bake pies and other confectioneries. It is difficult to bake the pie and other confectioneries. As known, the pie has a crust and a filling. Each of the crust and the filling needs to be cooked at a different rate, while the entire pie is subjected to the same heating in an oven. This typically leads to either burning the crust or undercooking the filling.

In order to overcome the above problem, several pie shields have been disclosed in the past to protect the crust from burning. One such example is disclosed in a U.S. Pat. No. 5,456,162, entitled "Pie crust baking shield" ("the '162 Patent"). The '162 Patent discloses a pie crust baking shield for protecting the outer edge portion of pie crust while a pie is being baked. The device may be provided either preformed into a ring with unconnected ends or straight for packaging purposes. Both embodiments are flexibly deformable to fit around a range of pie crust diameters and include an upright continuous flange portion and a plurality of side by side generally horizontal flange segments extending orthogonally from the upright flange portion. The free ends of the shield are releasably connectable in overlapping fashion against one another to define a plurality of preselected pie diameters. In use, the horizontal flange segments are supported atop the pie crust edge to define a continuous shield thereover which prevents burning the edge of the pie during baking.

Another example is disclosed in a United States Publication No. 20090255420, entitled "Pastry crust edge cover" ("the '420 Publication"). The '420 Publication discloses a pastry crust edge cover that includes a cover member manufactured from a first predetermined material and having a first predetermined shape and a first predetermined size. Such cover member includes at least a first outer wall having a first end and a second end, and a top crust covering portion having a first end and a second end, such first end of such first outer wall being connected to such first end of such top crust covering portion such that such top crust covering portion extends substantially perpendicularly from such first outer wall.

Yet another example is disclosed in a U.S. Pat. No. 10,674,765, entitled "Crimped and moldable pie baking strip" ("the 735 Patent"). The '735 Patent discloses a crimped strip of thin sheet metal (such as aluminium foil) or metal composite material that surrounds a pie crust from the body of the pie to the under edge of the pie crust. and protects it from burning or over-browning while cooking. The two outer edges of the strips width are crimped so that the final product, when viewed from the side, assumes a circular appearance. The crimped and moldable strip accommodates a variety of pie diameters and pie crust heights and designs because of its easily adjustable and moldable qualities. The crimped and moldable pie baking strip is malleable, the length can be cut to size, and the ends can be folded together to secure its position. It is designed primarily as a single use item to address an unmet market need.

Although the disclosures presented above, and other similar disclosures that are known are useful for protecting the outer edge of the pie crust, they have several problems. The pie shields that are currently available to home cooks have one feature in common i.e., they sit on top of the outer crust of a pie like a hat. For example, a cross section of a pie shield looks like the Greek letter gamma. In most ovens, the heating element is on the bottom, such that such a pie shield does not provide much protection and crusts still burn. Even in convection ovens, the crusts tend to burn during longer cook times Therefore, there is a need in the art to provide a pie crust protector or pie shield that protects the outer crust during long bake times in standard or convection ovens, regardless of where the heating element is located.

SUMMARY

It is one of the main objects of the present invention to provide a pie crust protector and that avoids the drawbacks of the prior art.

It is another object of the present invention to provide a pie crust protector or a pie shield that acts as a shield for protecting the outer edge of a pie crust during baking.

It is another object of the present invention to provide a pie crust protector that protects the outer crust during long bake times in standard or convection ovens, regardless of where the heating element is located.

In order to overcome the limitations here stated, the present invention provides a pie crust protector having an annular section with a first flange segment (upper lip) and a second flange segment (bottom lip). Each of the first flange segment and the second flange segment encompasses first grooves and first cut sections (radial cut sections). The first grooves and the first cut sections allow each of the first flange segment and the second flange segment to easily flex and receive a pie and/or a pie pan. The first flange segment encompasses a locking member.

Further, the pie crust protector includes a C-cross member. The C-cross member encompasses second grooves and second cut sections. The annular section encloses the outer edge of a pie on three sides. The C-cross member connects the annular section at one end and other end positions over the annular section. The locking member enters into a second groove through the second cut section to lock the length or diameter of the annular section. In other words, the annular section encloses the outer edge of the pie on three sides and the C-cross member adjusts to fit over the remaining portion of the pie.

In another embodiment, one end of the annular section includes a shoulder section having receiving sections. The other end of the annular section includes a strip with locking members. A locking member enters into a receiving section to lock the length or diameter of the annular section depending on the diameter of the pie or pie pan.

In one advantageous feature of the present invention, the pie crust protector or pie shield encloses the outer crust of the pie on three sides with a cross section (C-cross member) that looks like the letter "C". The pie crust protector is flange segmented on the top and bottom sides to fit over the pie pan or pie plates, which are of nine to eleven inches in diameter.

The pie crust protector protects the outer crust of the pie during long bake times in standard or convection ovens, regardless of where the heating element is located.

In another advantageous feature of the present invention, the pie crust protector or pie shield encloses the crust on three sides with the annular section and encloses the remaining portion with the-cross member to keep the crust from burning.

Features and advantages of the invention hereof will become more apparent in light of the following detailed description of selected embodiments, as illustrated in the accompanying FIGURES. As will be realized, the invention disclosed is capable of modifications in various respects, all without departing from the scope of the invention. Accordingly, the drawings and the description are to be regarded as illustrative in nature.

BRIEF DESCRIPTION OF THE DRAWINGS

With the above and other related objects in view, the invention consists in the details of construction and combination of parts as will be more fully understood from the following description, when read in conjunction with the accompanying drawings in which.

DESCRIPTION OF THE EMBODIMENTS OF THE INVENTION

Figure 1:
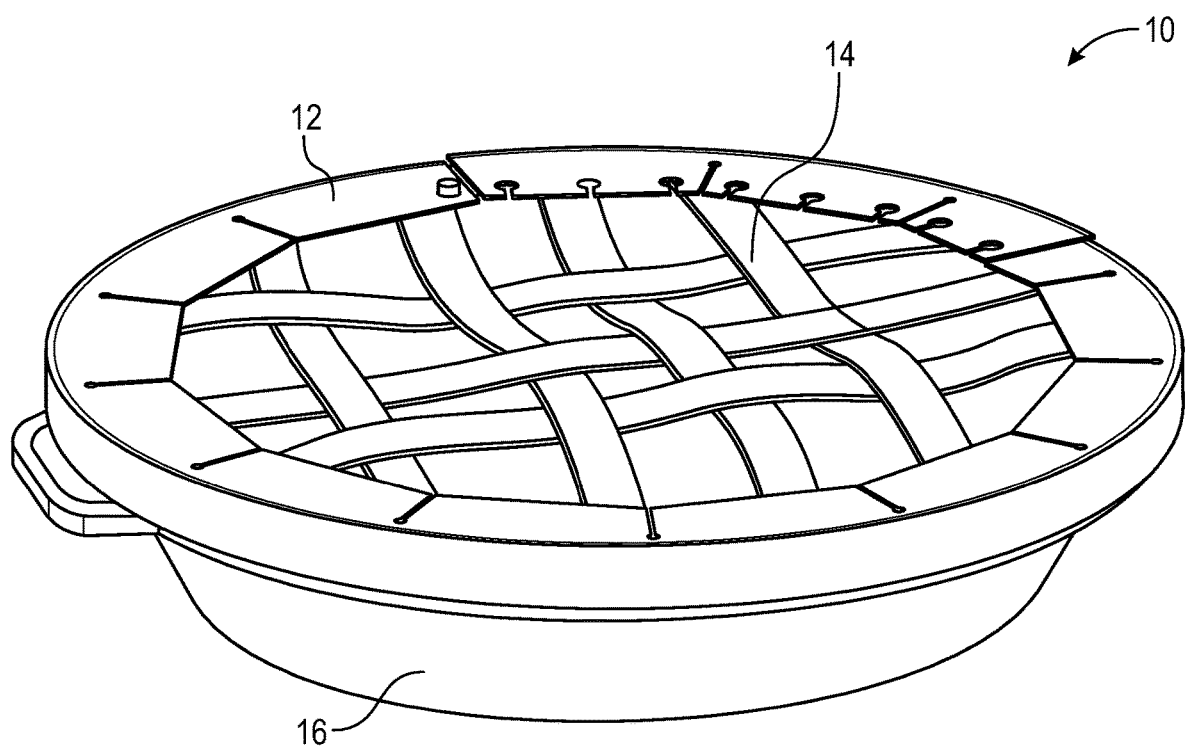
FIG. 1 illustrates an environment in which a pie crust protector implements, in accordance with one embodiment of the present invention.

The following detailed description set forth below in connection with the appended drawings is intended as a description of exemplary embodiments in which the presently disclosed invention may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed pie crust protector. However, it will be apparent to those skilled in the art that the presently disclosed invention may be practiced without these specific details. In some instances, well-known structures and devices are shown in functional or conceptual diagram form in order to avoid obscuring the concepts of the presently disclosed pie crust protector.

In the present specification, an embodiment showing a singular component should not be considered limiting. Rather, the invention preferably encompasses other embodiments including a plurality of the same component, and vice-versa, unless explicitly stated otherwise herein. Moreover, the applicant does not intend for any term in the specification to be ascribed an uncommon or special meaning unless explicitly set forth as such. Further, the present invention encompasses present and future known equivalents to the known components referred to herein by way of illustration.

Although the present invention provides a description of a pie crust protector, it is to be further understood that numerous changes may arise in the details of the embodiments of the pie crust protector. It is contemplated that all such changes and additional embodiments are within the spirit and true scope of this disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure.

The present invention discloses a pie crust protector or pie shield for protecting the outer edge of a pie crust during baking. The pie crust protector includes an annular section with a first flange segment and a second flange segment. Each of the first flange segment and the second flange segment encompasses first grooves and first cut sections. The first grooves and the first cut sections allow each of the first flange segment and the second flange segment to easily flex and receive a pie and/or a pie pan. The pie crust protector includes a C-cross member segmented on the top and bottom sides. The annular section encloses the outer edge of the pie on three sides and the C-cross member encloses the remaining portion of the pie. The pie crust protector protects the outer edge of the pie during long bake times in standard or convection ovens, regardless of the location of a heating element.

Various features and embodiments of a pie crust protector are explained in conjunction with the description of FIGS. 1-6.

Figure 2A:
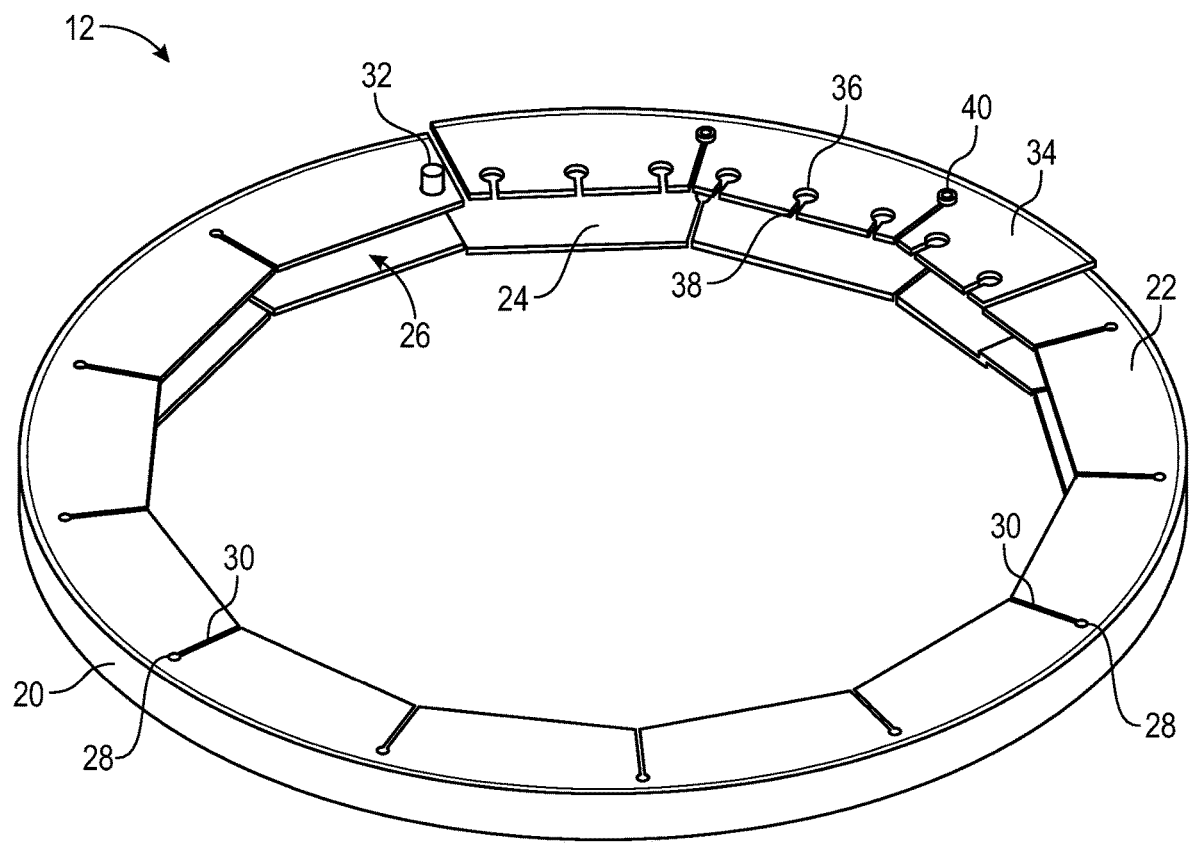
FIGS. 2A, 2B and 2C illustrate a perspective view, a top view and a side view, respectively of the pie crust protector, in accordance with one embodiment of the present invention.
Figure 2B:
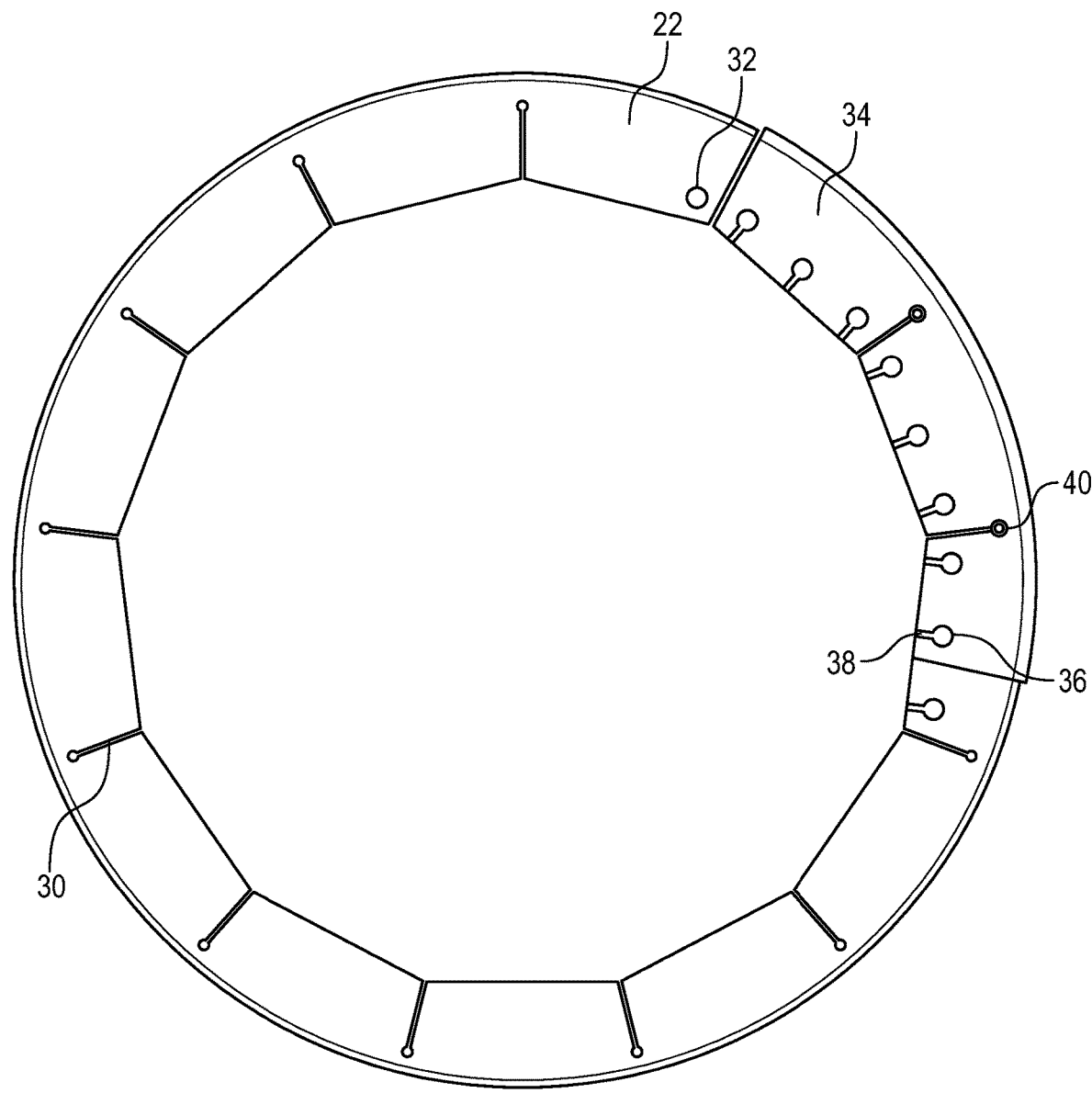
Figure 2C:
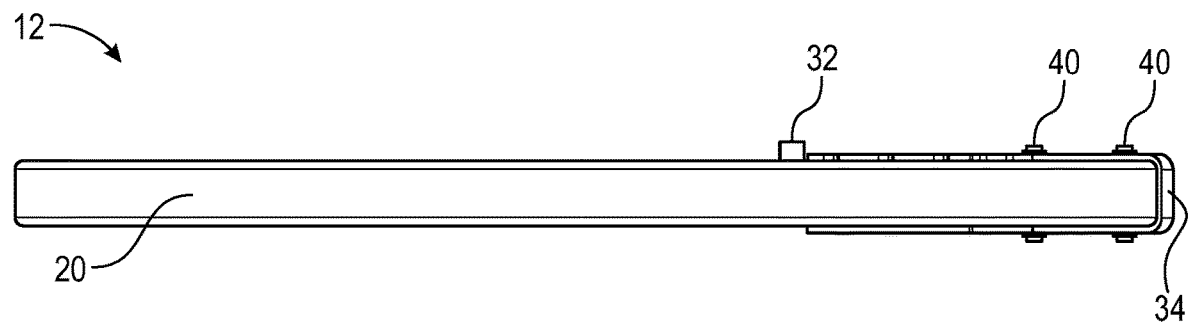

Referring to FIG. 1, environment 10 in which a pie crust protector 12 implements, in accordance with one embodiment of the present invention. Pie crust protector 12 mounts around the edges of pie 14 from burning pie pan 16. FIGS. 2A, 2B and 2C show a perspective view, a top view and a side view, respectively of pie crust protector 12, in accordance with one embodiment of the present invention. Pie crust protector 12 includes an annular section or circular rim or circular ring 20. Annular section 20 comes in a substantially circular configuration. Annular section 20 is made of a silicone or thin sheet metal such as aluminium foil or any other suitable material. Annular section 20 includes a first flange segment 22 and a second flange segment 24 extending from annular section 20. First flange segment 22 and second flange segment 24 indicate a top flange segment or top lip and a bottom flange segment or bottom lip, respectively. Here, annular section 20 acts as an outer wall in a circular configuration, and first flange segment 22 and second flange segment 24 extend inwards of the circular configuration. In one example, annular section 20 encompasses eleven (11) first flange segments 22 and eleven (11) second flange segments 24. In another example, annular section 20 encompasses up to fourteen (14) first flange segments 22 and up to fourteen (14) second flange segments 24. A person skilled in the art understands that any number of suitable first flange segments 22 and second flange segments 24 can be provided depending on the shape and size of pie 14 or pie pan 16 without departing from the scope of the present invention. First flange segment 22 and second flange segment 24 form a receiving section 26 for receiving pie 14 and/or pie pan 16.

Each of first flange segment 22 and second flange segment 24 encompasses a plurality of first grooves or simply first grooves 28. First grooves 28 indicate holes drawn through each of first flange segment 22 and second flange segment 24. First grooves 28 position at equal or varied distance from one another. Each of first grooves 28 encompasses a first cut section 30. First cut section 30 indicates a hole or a portion of first flange segment 22 and second flange segment 24 cut from first groove 28 until the edge of first flange segment 22 and second flange segment 24. First grooves 28 and first cut sections 30 allow each of first flange segment 22 and second flange segment 24 to easily flex and receive pie 14 and/or pie pan 16. In one embodiment, first flange segment 22 encompasses a locking member 32. Locking member 32 extends from the surface of first flange segment 22. In one example, locking member 32 positions at the edge of first flange segment 22. Locking member 32 comes in a cylindrical, square, rectangular or any other configuration.

In one embodiment, pie crust protector 12 includes a C-cross member 34. C-cross member 34 is made of a silicone or thin sheet metal such as aluminium foil or any other suitable material. C-cross member 34 connects at one end of annular section via connecting members 40 such as a fastener or any other connecting mechanism. C-cross member 34 connects at one end of annular section 20 and positions over other end of annular section 20 in an overlapping manner. As can be seen, C-cross member 34 mimics the shape of annular section 20 in that the top flange segment is similar to first flange segment 22 and the bottom flange segment is similar to second flange segment 24. C-cross member 34 encompasses a plurality of second grooves or simply second grooves 36. Second grooves 36 indicate holes drawn through C-cross member 34. Second grooves 36 position at equal or varied distance from one another. Each of second grooves 36 encompasses a second cut section 38. Second cut section 38 indicates a hole or a portion of C-cross member 34 that is cut until the edge of C-cross member 34.

Figure 3:
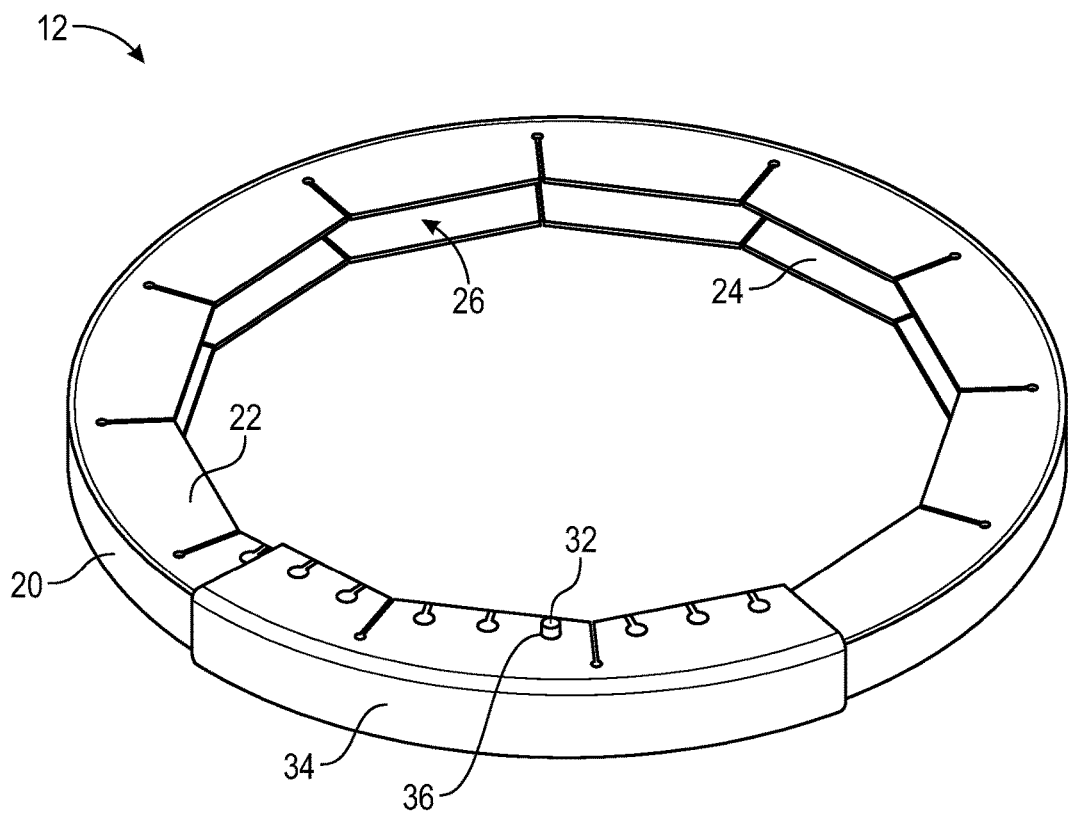
FIG. 3 illustrates the feature of length or diameter adjustment of the pie crust protector, in accordance with one embodiment of the present invention.

In the present invention, C-cross member 34 extends into the other end of C-cross member 34 such that locking member 32 enters into a second groove 36 through second cut section 38 to lock the length or diameter of annular section 20. FIG. 3 shows an exemplary embodiment in which locking member 32 locks into second groove 36. A person skilled in the art understands that a user (not shown) adjusts the diameter of pie crust protector 12 and fits circumferentially around pie 14. Subsequently, the user places locking member 32 at appropriate second groove 36 depending on the size of pie 14 and/or pie pan 16, as shown in FIG. 1.

Figure 4:
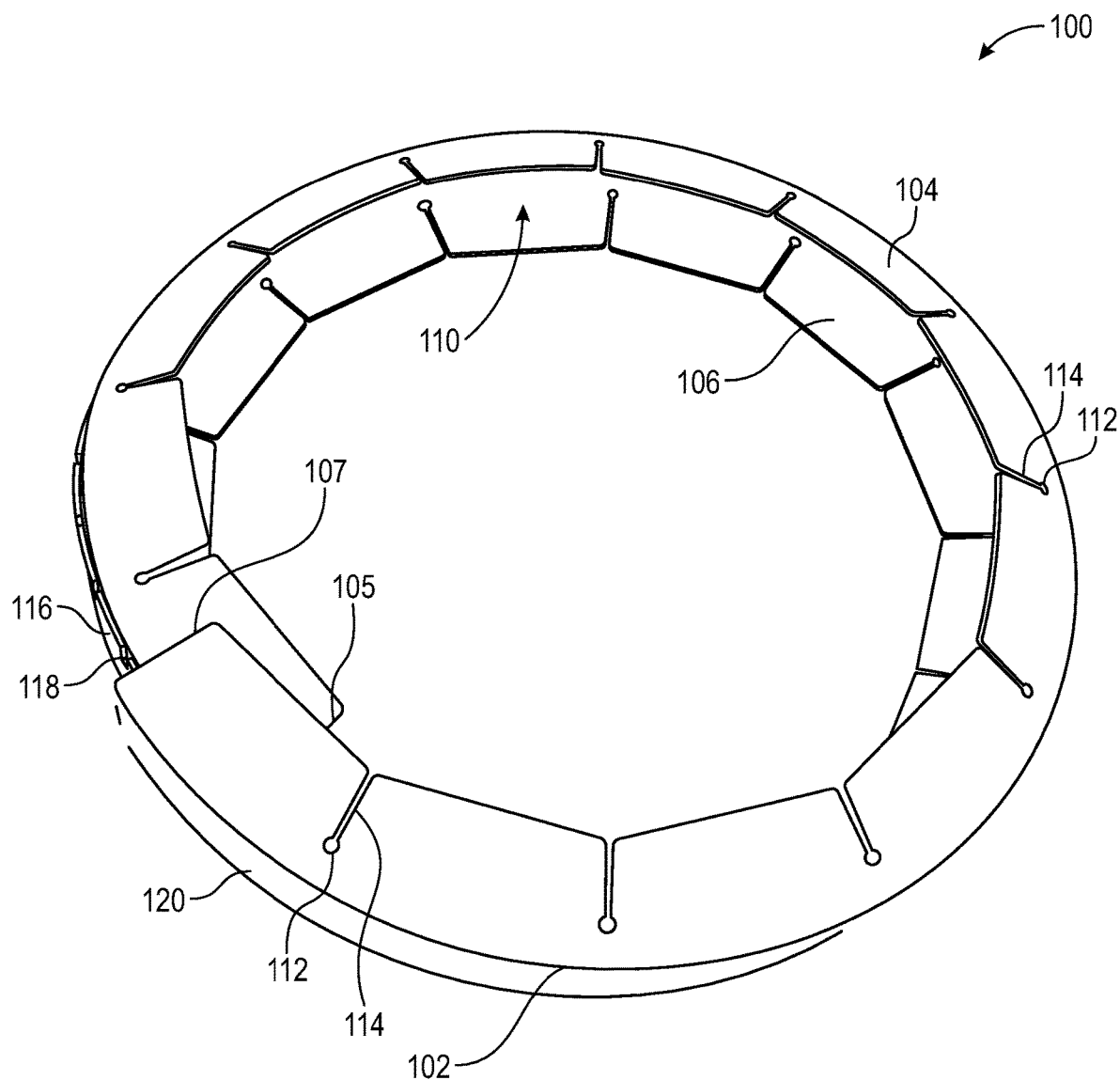
FIGS. 4 through 6 illustrate a pie crust protector, in accordance with another embodiment of the present invention.
Figure 5:
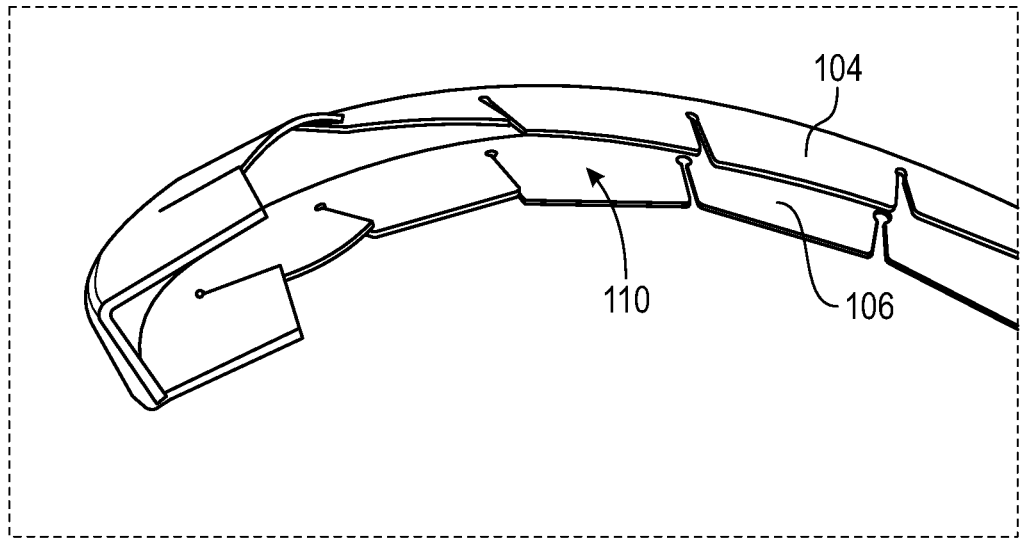

FIG. 4 shows a pie crust protector 100, in accordance with another embodiment of the present invention. Pie crust protector 100 includes an annular section or circular rim or circular ring 102. Annular section 102 is made of a silicone or any other suitable material. Annular section 102 includes a first flange segment 104 and a second flange segment 106 extending from annular section 102. Here, annular section 102 acts as an outer wall in a circular configuration and first flange segment 104 and second flange segment 106 extend inwards of the circular configuration. Annular section 102 encompasses a first end 105 (as shown in FIG. 5) and a second end 107. First end 105 and second end 107 indicates an opposite tip or edge or free end of annular section 102. First flange segment 104 and second flange segment 106 form a receiving section 110 for receiving a pie (not shown) and/or a pie pan (not shown).

Each of first flange segment 104 and second flange segment 106 encompasses a plurality of first grooves or simply first grooves 112. First grooves 112 indicate holes drawn through each of first flange segment 104 and second flange segment 106. First grooves 112 position at equal or varied distance from one another. Each of first grooves 112 encompasses a first cut section 114. First cut section 114 indicates a hole or a portion of first flange segment 104 and second flange segment 106 cut from first groove 112 until the edge of first 104 and second flange segment 106. First grooves 112 and first cut sections 114 allow each of first flange segment 104 and second flange segment 106 to easily flex and receive the pie and/or the pie pan.

Figure 6:
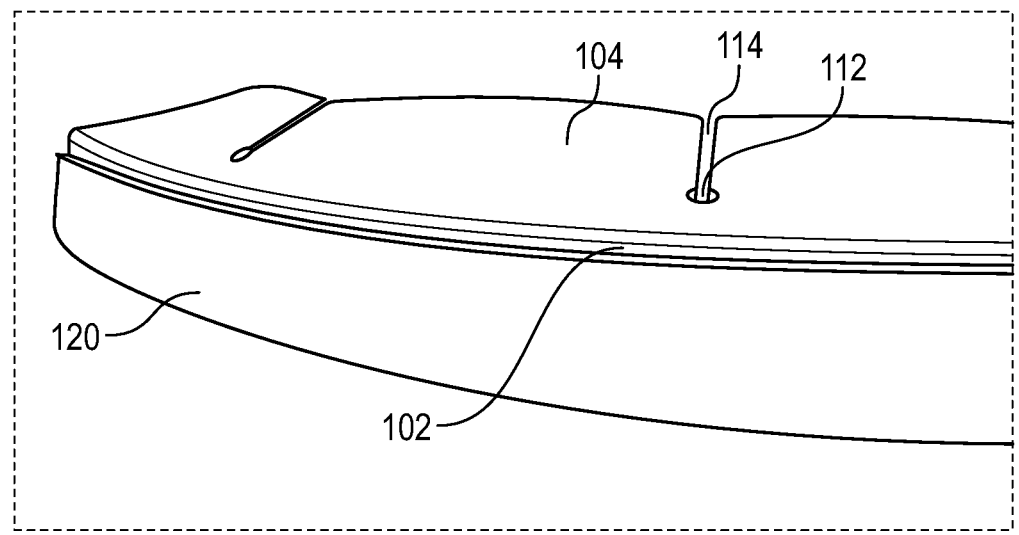

In the present embodiment, annular section 102 encompasses a shoulder section 116 at first end 105. Shoulder section 116 indicates a layer mounted over the outer surface of annular section 102. Shoulder section 116 encompasses receiving sections 118 positioned at equal or varied distance from one another. Further, annular section 102 encompasses a locking strip 120 at second end 107. Locking strip 120 indicates a strip that mounts over the outer surface of annular section 102, as shown in FIG. 6. In one exemplary embodiment, locking strip 120 includes one or more locking members (not shown). The locking members include fasteners or any other member that enters receiving sections 118 and locks the positon of locking strip 120 with respect to annular section 102.

In operation, a user (not shown) places second tip 107 over first tip 105 and locks the locking member in a receiving section 118 for adjusting the diameter of pie crust protector 100. A person skilled in the art understands that the user adjusts the diameter of pie crust protector 100 by the connecting locking member at appropriate receiving section 118 depending on the size of the pie and/or the pie pan.

Based on the above, it is evident that the presently disclosed annular section encloses the outer crust of the pie on three sides and the remaining side with the C-cross member. The C-cross member too has flange segments on the top and bottom sides to fit the pie pan or pie plates. The pie crust protector protects the outer crust of the pie during long bake times in standard or convection ovens, regardless of where the heating element is located.

A person skilled in the art appreciates that the pie crust protector may come in a variety of shapes and sizes depending on the need and comfort of the user. Further, many changes in the design and placement of components may take place without deviating from the scope of the presently disclosed pie crust protector.

In the above description, numerous specific details are set forth such as examples of some embodiments, specific components, devices, methods, in order to provide a thorough understanding of embodiments of the present invention. It will be apparent to a person of ordinary skill in the art that these specific details need not be employed, and should not be construed to limit the scope of the invention.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the invention. Various modifications to these embodiments will be readily apparent to those skilled in the art, and the novel principles and invention disclosed herein may be applied to other embodiments without the use of the innovative faculty. It is contemplated that additional embodiments are within the spirit and true scope of the disclosed invention.

What is claimed is:

1. A pie crust protector, comprising:
an annular section;
a first flange segment and a second flange segment, wherein said first flange segment and said second flange segment extend inward from said annular section, wherein said first flange segment indicates an upper lip and said second flange segment indicates a lower lip, wherein said first flange segment and said second flange segment form a receiving section, and wherein each of said first flange segment and said second flange segment comprises first grooves and first cut sections;
a locking member, wherein said locking member extends upwards from the surface of said first flange segment; and
a C-cross member, wherein said C-cross member extends from a distal end of said annular section, wherein said C-cross member comprises second grooves,
wherein said receiving section receives a pie such that said first flange segment and said second flange segment hold said pie in place,
wherein said C-cross member extends over the other end of said annular section, and wherein locking member inserts and locks in said second grooves such that said annular section and said C-cross member circumferentially fit around said pie.

2. The pie crust protector of claim 1, wherein said first grooves and said first cut sections allow each of said first flange segment and said second flange segment to easily flex and receive said pie.

3. The pie crust protector of claim 1, wherein said first grooves position at equal or varied distance from one another.

4. The pie crust protector of claim 1, wherein said first cut section indicates a hole or a portion of said first flange segment and said second flange segment cut from said first groove until the edge of said first flange segment and said second flange segment.

5. The pie crust protector of claim 1, wherein said C-cross member is made of a silicone or thin sheet metal.

6. The pie crust protector of claim 1, wherein said C-cross member connects to said annular section via a connecting member.

7. The pie crust protector of claim 1, wherein said C-cross member mimics the shape of said annular section, and wherein said C-cross member comprises top flange segments and bottom flange segments.

8. The pie crust protector of claim 7, wherein said top flange segments comprise said second grooves, each having a second cut-section.

9. The pie crust protector of claim 8, wherein said second cut-section is a hole cut at said top flange segments extending from said second grooves until the edge of said C-cross member.

10. The pie crust protector of claim 9, wherein said second grooves and said second cut sections allow said top flange segments to flex and receive said pie.

11. The pie crust protector of claim 1, wherein said locking member positions at the edge of said first flange segment.

12. The pie crust protector of claim 1, wherein said annular section comprises a shoulder section, wherein said shoulder section positions at the outer portion of said annular section, and wherein said shoulder section comprises receiving sections positioned at equal or varied distance from one another.

13. The pie crust protector of claim 12, wherein said annular section comprises a locking strip, and wherein said locking strip positions at the outer portion of said annular section.

14. The pie crust protector of claim 13, wherein said locking strip comprises said locking member.

15. The pie crust protector of claim 14, wherein said locking member locks in said receiving sections at said shoulder section to adjust the diameter of said annular section.

16. A method of providing a pie crust protector, the method comprising the steps of:
providing an annular section;
providing a first flange segment and a second flange segment, said first flange segment and said second flange segment extending inward from said annular section, said first flange segment indicating an upper lip and said second flange segment indicating a lower lip, said first flange segment and said second flange segment forming a receiving section, each of said first flange segment and said second flange segment comprising first grooves and first cut sections;
providing a locking member, said locking member extending from the surface of said first flange segment;
providing a C-cross member extending from a distal end of said annular section, said C-cross member comprising second grooves;
receiving a pie at said receiving section such that said first flange segment and said second flange segment hold said pie in place;
extending said C-cross member over the other end of said annular section; and
inserting and locking said locking member in said second grooves such that said annular section and said C-cross member circumferentially fit around said pie.

17. The method of claim 16, further comprising providing the shape of said C-cross member mimicking said annular section.

18. The method of claim 16, further comprising providing top flange segments and bottom flange segments at said C-cross member.

19. The method of claim 18, further comprising providing said second grooves at said top flange segments, each second groove having a second cut-section, said second cut-section extending from said second groove until the edge of C-cross member.

20. The method of claim 16, further comprising flexing said first flange segment and said second flange segment for receiving said pie.

* * * * *